(12) United States Patent
Zuo et al.

(10) Patent No.: US 10,093,213 B2
(45) Date of Patent: Oct. 9, 2018

(54) ARMREST RELEASE MECHANISM

(71) Applicant: Lear Corporation, Southfield, MI (US)

(72) Inventors: Yue Zuo, Shanghai (CN); XiaoZhong Wu, Shanghai (CN); Cheng Zhan, Shanghai (CN); Chaoyan Zhan, Shanghai (CN); Yaoju Song, Shanghai (CN); Weiping Li, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/387,810

(22) Filed: Dec. 22, 2016

(65) Prior Publication Data
US 2018/0178688 A1    Jun. 28, 2018

(51) Int. Cl.
*A47C 7/54* (2006.01)
*B60N 2/75* (2018.01)
*B60N 2/46* (2006.01)

(52) U.S. Cl.
CPC .......... *B60N 2/787* (2018.02); *B60N 2/4613* (2013.01); *B60N 2/4673* (2013.01); *B60N 2/757* (2018.02)

(58) Field of Classification Search
CPC .... B60N 2/4673; B60N 2/4613; B60N 2/464; B60N 2/46; B60N 2/4626; B60N 2/4633; B60N 2/468; B60N 2/4653; B60N 2/4606; B60N 2/462
USPC ... 297/411.26–411.28, 411.3, 411.31–411.32
See application file for complete search history.

(56) References Cited

U.S. PATENT DOCUMENTS

| | | | | |
|---|---|---|---|---|
| 4,938,603 A * | 7/1990 | Turner | ...................... | A47D 1/02 297/153 |
| 5,509,722 A * | 4/1996 | Beroth | ............... | B64D 11/0693 244/118.6 |
| 5,597,139 A * | 1/1997 | Beroth | ............... | B64D 11/0693 244/118.6 |
| 7,717,009 B2 * | 5/2010 | Cho | ........................ | B60N 3/083 188/290 |
| 8,454,073 B2 * | 6/2013 | Grandel | .............. | B60R 11/0235 296/37.12 |
| 8,888,147 B2 * | 11/2014 | Blanck | ...................... | B60R 7/04 292/34 |
| 9,199,562 B2 * | 12/2015 | Skapof | .................. | B60N 2/4606 |
| 2004/0080173 A1 * | 4/2004 | Niwa | ................... | B60N 2/4646 296/24.34 |
| 2004/0080200 A1 * | 4/2004 | Golynsky | .............. | A47C 1/025 297/301.5 |

(Continued)

FOREIGN PATENT DOCUMENTS

DE      10052838 A1      5/2002

*Primary Examiner* — Mark R Wendell
(74) *Attorney, Agent, or Firm* — MacMillan, Sobanski & Todd, LLC

(57) ABSTRACT

A vehicle armrest includes an armrest base having a pivot axle that extends along a pivot axis. The armrest base also includes a release mechanism that includes a pair of latch extensions supported on the armrest base for relative movement along a latch axis that is substantially parallel to the pivot axis. A latch spring biases the latch extensions apart from each other. A release handle is mounted on the armrest base for relative movement in a handle release direction. A pinion is mounted on the armrest base for relative rotational movement. Movement of the release handle in the release direction causes rotation of the pinion relative to the armrest base which, in turn, causes the latch extensions to move along the latch axis toward one another.

9 Claims, 7 Drawing Sheets

(56) References Cited

U.S. PATENT DOCUMENTS

| | | | |
|---|---|---|---|
| 2004/0100122 A1* | 5/2004 | Bornchen | B60N 2/4626 296/153 |
| 2010/0050380 A1* | 3/2010 | Fujiwara | B60N 2/4686 16/242 |
| 2014/0125107 A1* | 5/2014 | Cha | B60N 2/4613 297/411.3 |
| 2016/0272098 A1* | 9/2016 | Barnes | B60N 3/001 |
| 2017/0341544 A1* | 11/2017 | Bozio | B60N 2/4686 |

* cited by examiner

US 10,093,213 B2

ARMREST RELEASE MECHANISM

BACKGROUND OF THE INVENTION

The present invention relates in general to a release mechanism for a vehicle armrest and, more specifically, to a mechanism that allows a center armrest to be selectively latched into position relative to a bench-type vehicle seat.

Vehicles such as passenger cars typically include armrests for the comfort of vehicle occupants. Often, in vehicles with a bench-type seat, a center armrest is provided that may be moved between a lowered use position, and a raised storage position. In the use position, the armrest is available for use by occupants on either side of the armrest, while in the storage position, the center portion of the seat is available for use by a third occupant, for example.

It is often desirable to latch the armrest in place when it is in the storage position. It is also desirable to easily release the latch so that the armrest may be moved to the use position. It would be advantageous to have an improved mechanism to selectively latch an armrest in position.

SUMMARY OF THE INVENTION

The invention relates to a vehicle armrest. The vehicle armrest includes an armrest base. The armrest base includes a pivot axle that extends along a pivot axis. The armrest base also includes a release mechanism that includes a pair of latch extensions supported on the armrest base for relative movement along a latch axis that is substantially parallel to the pivot axis. A latch spring biases the latch extensions apart from each other. A release handle is mounted on the armrest base for relative movement in a handle release direction. A pinion is mounted on the armrest base for relative rotational movement. Movement of the release handle in the release direction causes rotation of the pinion relative to the armrest base which, in turn, causes the latch extensions to move along the latch axis toward one another.

In one embodiment of the vehicle armrest, a slider is supported on the armrest base for relative movement along a slide axis. The slider includes a gear rack that engages the pinion. When the release handle is moved in the release direction the slider moves in a release direction parallel to the slide axis. In one embodiment of the vehicle armrest, when the latch spring biases the latch extensions apart from each other it biases the slider in a direction opposite the release direction. In one embodiment of the vehicle armrest, when the slider is biased in the direction opposite the release direction the release handle is biased in a direction opposite the handle release direction. In one embodiment of the vehicle armrest, the pivot axle is mounted to a frame for relative rotational movement of the armrest base. The latch extensions engage the frame to prevent movement of the armrest base relative to the frame.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
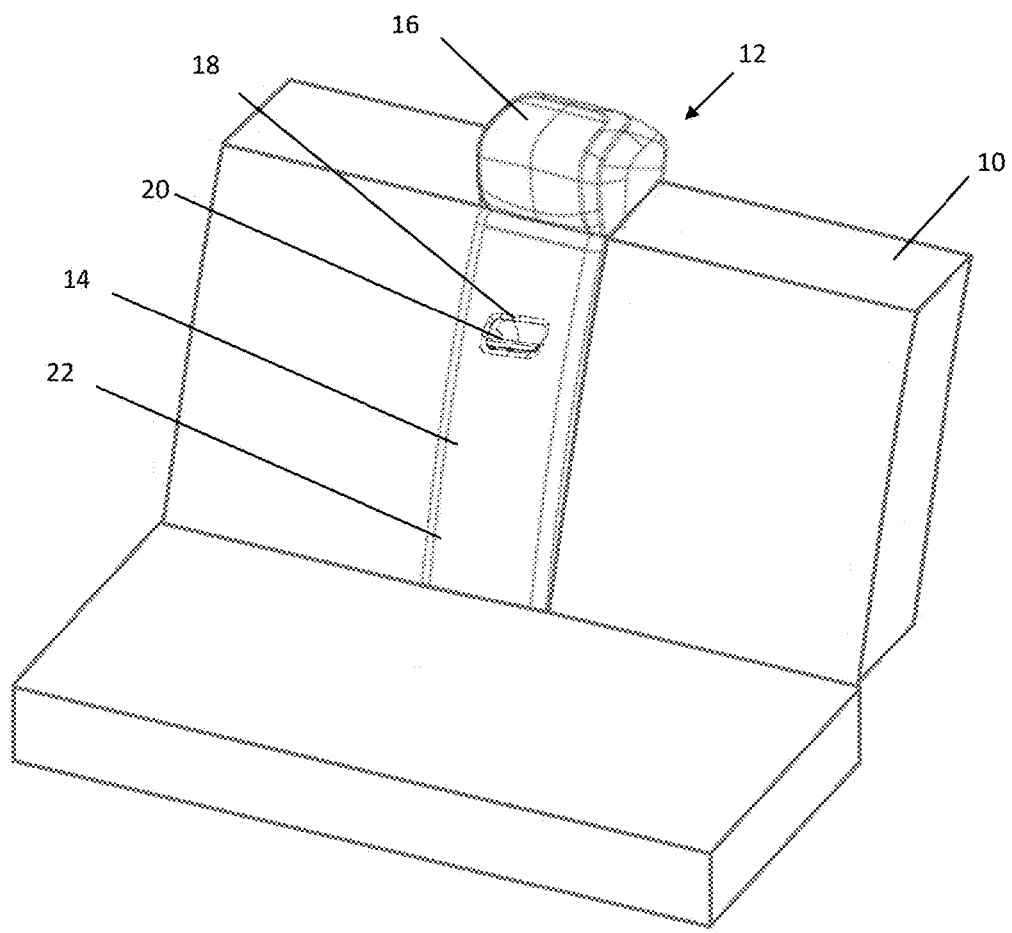
FIG. 1 is a perspective view of a bench-type vehicle seat including an armrest in accordance with this invention.

Referring now to the drawings, there is illustrated in FIG. 1 a bench-type vehicle seat 10 that includes a center armrest, indicated generally at 12. The armrest 12 includes a body portion 14 and a headrest portion 16. The armrest 12 is shown in a storage position, where the armrest 12 is raised relative to the seat 10 and the seat 10 is configured to accommodate three occupants. The armrest 12 may be rotated relative to the seat 10 to a use position, as is well known in the art, where the seat 10 is configured to accommodate two occupants, with the armrest 12 located between them. The armrest 12 includes a handle opening 18 and a release handle 20 that is accessible to the occupants. The release handle 20 may be operated to allow rotation of the armrest 12 relative to the seat 10, as described below. The armrest 12 also includes a trim 22 that covers the underlying structure.

Figure 2:
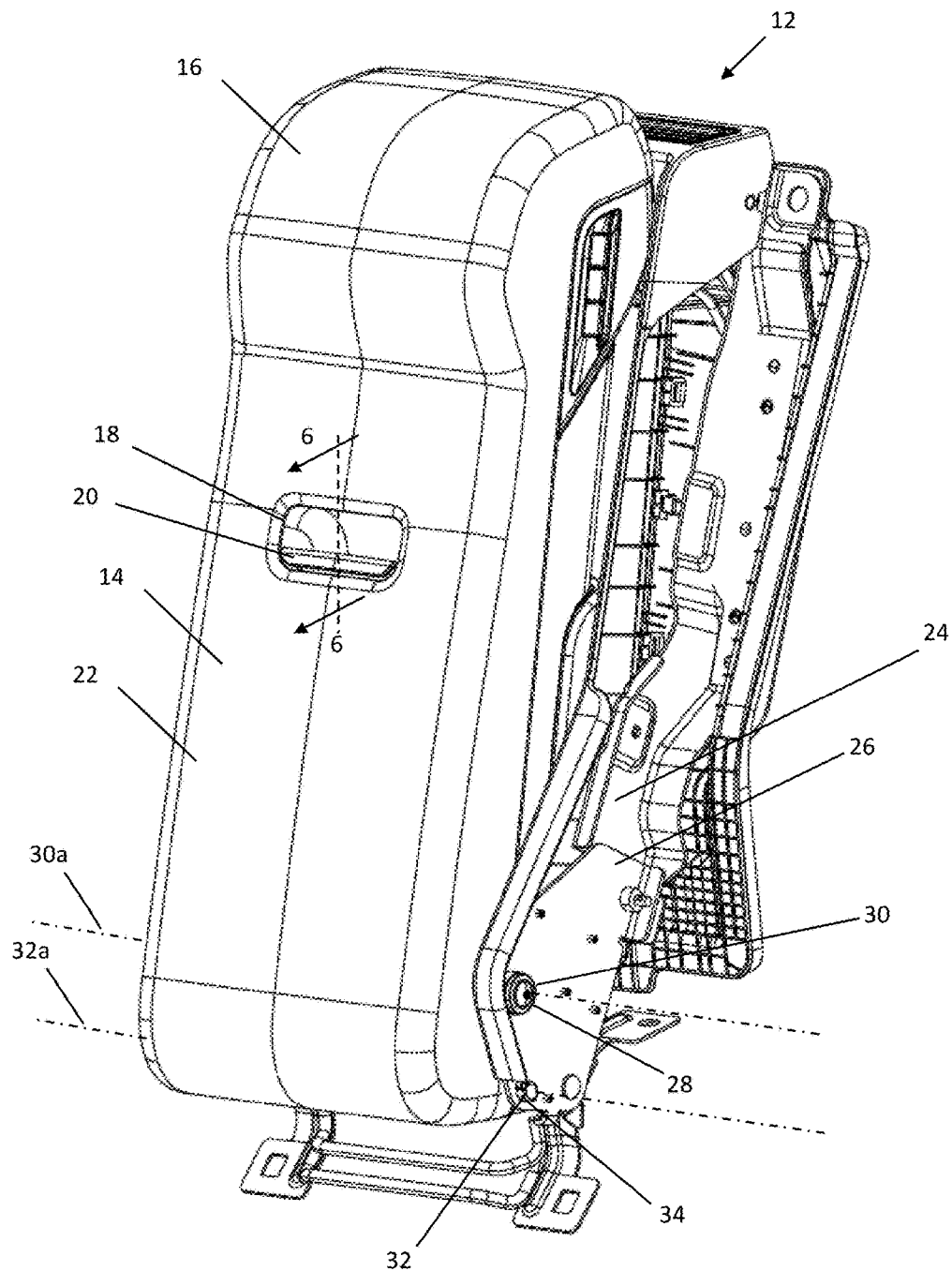
FIG. 2 is an enlarged perspective view of the armrest illustrated in FIG. 1 with an associated frame.
Figure 3:
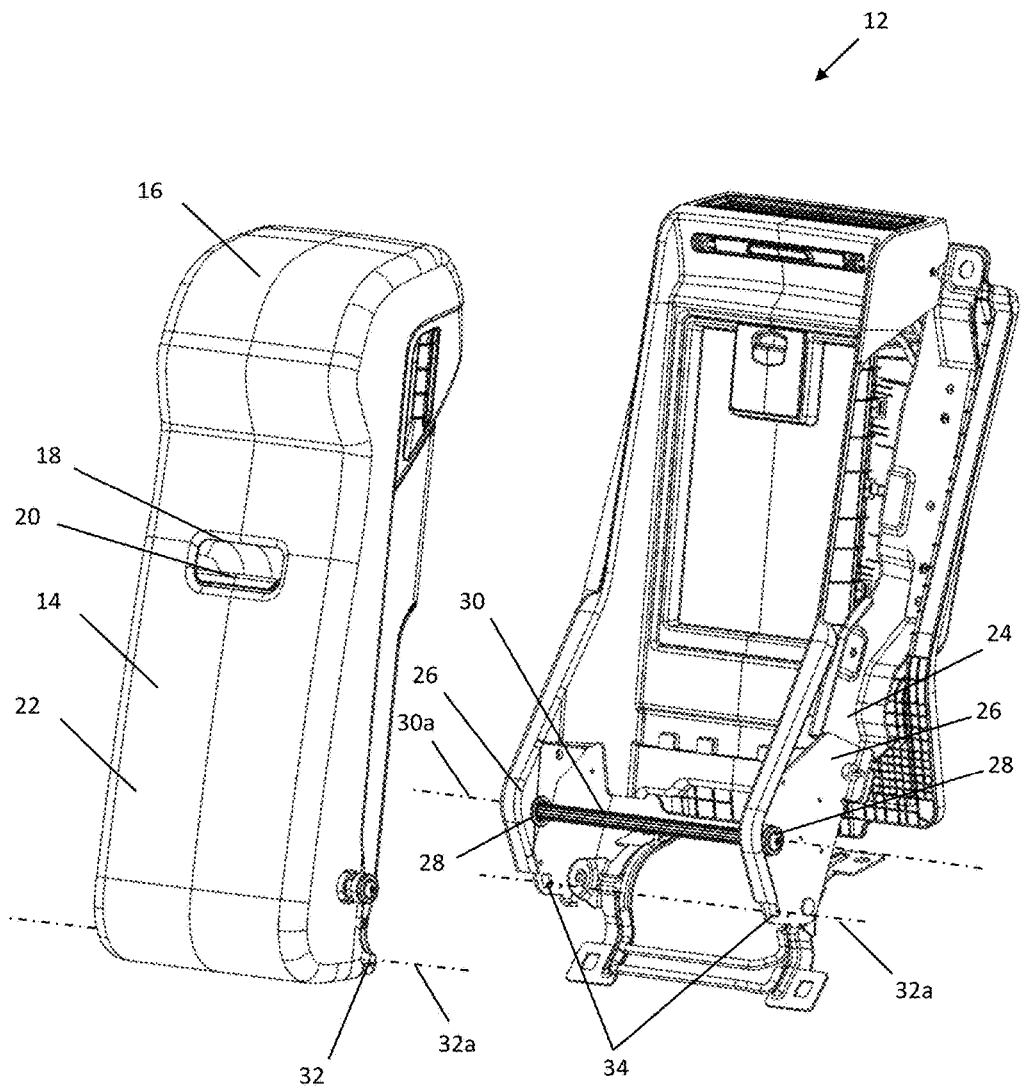
FIG. 3 is an exploded perspective view of the armrest and the frame illustrated in FIG. 2.

Referring now to FIG. 2 and FIG. 3, the armrest 12 and an associated frame 24 are shown apart from the seat 10. The armrest 12 is attached to the frame 24 for relative rotational movement. The frame 24 includes a pair of opposed support plates 26 that are located on opposed sides of the body portion 14 of the armrest 12. Each of the support plates 26 includes an axle opening 28. The armrest 12 includes a pivot axle 30 that passes through the axle opening 28 on each support plate 26. The armrest 12 is supported on the pivot axle 30 such that the armrest 12 is able to rotate relative to support plates 26 about a pivot axis 30a defined by the pivot axle 30.

The armrest 12 also includes a pair of latch pins 32, only one of which is visible in FIG. 2 and FIG. 3. The latch pins 32 extend from opposed sides of body portion 14 of the armrest 12. The latch pins 32 define a latch axis 32a that is substantially parallel to the pivot axis 30a. Each of the support plates 26 includes a latch opening 34. As shown in FIG. 2, each latch pin 32 extends from the armrest 12 into one of the latch openings 34. When the latch pins 32 are positioned in the respective latch openings 34, the latch pins 32 engage the respective support plate 26 and prevent rotation of the armrest 12 relative to the frame 24.

Figure 4:
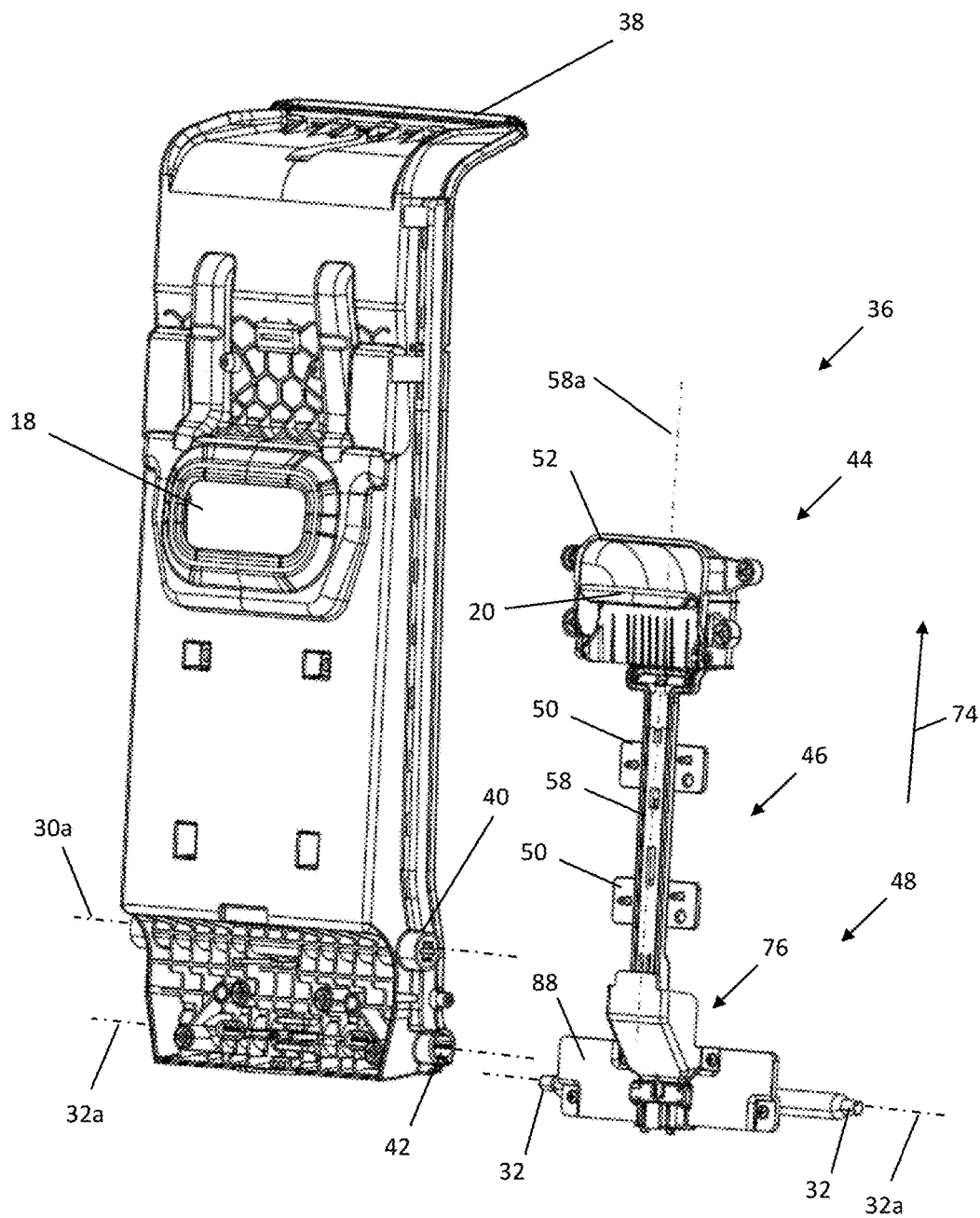
FIG. 4 is an exploded perspective view of the armrest illustrated in FIG. 3 and a release mechanism.

Referring now to FIG. 4, the armrest 12 is shown with the trim 22 removed and further exploded, with an armrest release mechanism, indicated generally at 36, removed from an armrest base 38. The armrest base 38 includes an axle mount 40 that accommodates the pivot axle 30. The armrest base 38 also includes a latch slot 42, the purpose of which will be described below. The armrest release mechanism 36 includes a handle assembly, indicated generally at 44, a slider, indicated generally at 46, and a latch assembly, indicated generally at 48. Two optional slide brackets 50 engage the slider 46 and are fixed relative to the armrest base 38. The slide brackets 50 allow limited movement of the slider 50 relative to the armrest base 38, as will be described below.

Figure 5:
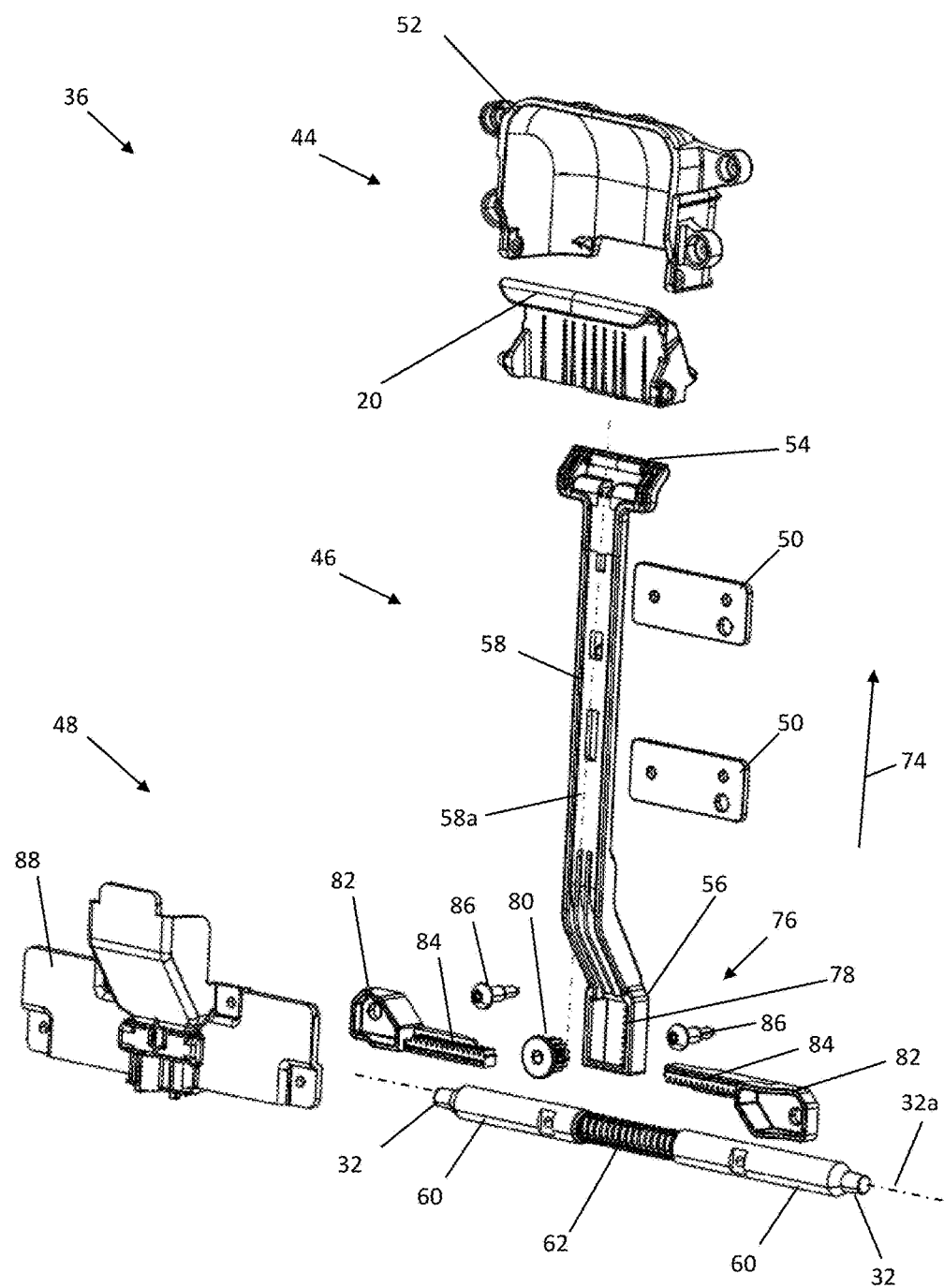
FIG. 5 is an exploded perspective view of the release mechanism illustrated in FIG. 4.

Referring now to FIG. 5, an exploded view of the armrest release mechanism 36 is shown. The handle assembly 44 includes the release handle 20 and a handle base 52. The slider 46 includes a handle end 54, a latch end 56, and a shaft 58 that extends from the handle end 54 to the latch end 56 along a slide axis 58a. The latch assembly 48 includes a pair of latch extensions 60 that extend along the latch axis 32a. The illustrated latch extensions 60 are made of plastic and are substantially cylindrical in shape, but may be made of any desired material and may have any desired shape. The latch pins 32 are located on outer, opposed ends of the latch extensions 60. The illustrated latch pins 32 are integral portions of the respective latch extension 60, but they may be separate components if desired. A latch spring 62 is located between the latch extensions 60. The latch spring 62 is a compression spring and applies a force to each of the latch extensions 60 to push them apart from one another along the latch axis 32a.

Figure 6:
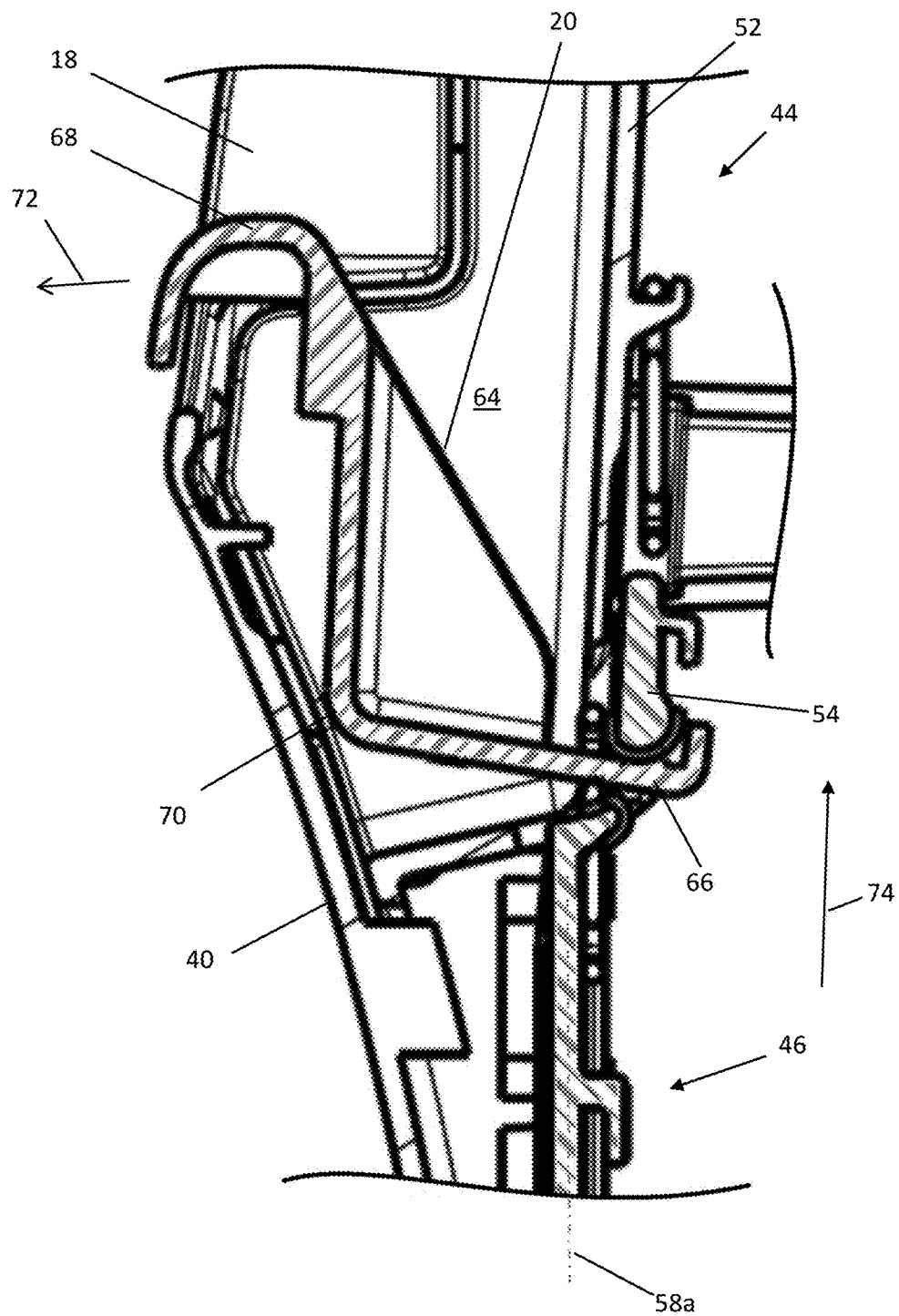
FIG. 6 is an enlarged cross-sectional view of a release handle of the armrest and the release mechanism, taken along the line 6-6 of FIG. 2.

Referring now to FIG. 6, a cross-sectional view of a portion of the armrest 12 is shown, taken along the line 6-6 of FIG. 2. The cross-section shown in FIG. 6 is taken through the release handle 20, the handle base 52, and the handle end 54 of the slider 46. The handle base 52 is attached to the armrest base 38 to define a handle space 64 therebetween. The release handle 20 is located in the handle space 64, and the handle opening 18 provides access for the occupants to reach the release handle 20. The release handle 20 includes a handle mate end 66, a grip end 68, and a pivot area 70 located therebetween. The handle mate end 66 engages the handle end 54 of the slider 46 for limited relative movement between the release handle 20 and the slider 46. An occupant may grasp the grip end 68 of the release handle 20 and apply a force in a handle release direction 72, which is generally forward when the armrest 12 is in the storage position. This force will cause the release handle 20 to rotate relative to the armrest base 38 about the pivot area 70, where the release handle 20 engages the armrest base 38. This rotation of the release handle 20 will cause the handle mate end 66 to move upwardly as viewed in FIG. 6. The upward movement of the handle mate end 66 will also move the engaged slider 46 upwardly in a slider release direction 74.

Referring back to FIG. 4 and FIG. 5, the armrest release mechanism 36 includes an actuator, indicated generally at 76. The actuator 76 serves to coordinate movement of the slider 46 and the latch extensions 60. The illustrated actuator 76 includes a slider gear rack 78 located on latch end 56 of the slider 46. The illustrated slider gear rack 78 is molded as part of the slider 46, but may be a separate component if desired. The actuator 76 includes a pinion 80 that is mounted to the armrest base 38 for relative rotational movement. The illustrated pinion 80 is made of plastic, but may be made of any desired material. When the actuator 76 is assembled, teeth of the gear rack 78 mesh with teeth of the pinion 80 so that when the gear rack 78 moves linearly in the slider release direction 74, the pinion 80 will rotate relative to the armrest base 38. The actuator 76 includes two extension sliders 82, and each extension slider 82 includes an extension rack 84. The illustrated extension sliders 82 are made of plastic, but may be made of any desired material. Additionally, the illustrated extension racks 84 are molded as part of the respective extension slider 82, but may be separate components if desired. When the actuator 76 is assembled, teeth of the extension racks 84 mesh with the teeth of the pinion 80 so that when the pinion 80 rotates relative to the armrest base 38, the extension racks 84 move in a direction parallel to the latch axis 32a. Each extension slider 82 is connected to one of the latch extensions 60 by an extension pin 86. The illustrated extension pins 86 are made of plastic, but may be made of any desired material. The extension pins 86 are provided so that a force applied to the extension slider 82 is transferred to the respective latch extensions 60. The actuator 76 also includes a cover panel 88 that is mounted to the armrest base 38. The illustrated cover panel 88 is made of plastic, but may be made of any desired material. When the actuator 76 is assembled, the cover panel 88 constrains movement of the pinion 80 to rotational movement relative to the armrest base 38, and further constrains movement of the extension sliders 82 to linear movement relative to the armrest base 38 in the direction parallel to the latch axis 32a.

Figure 7:
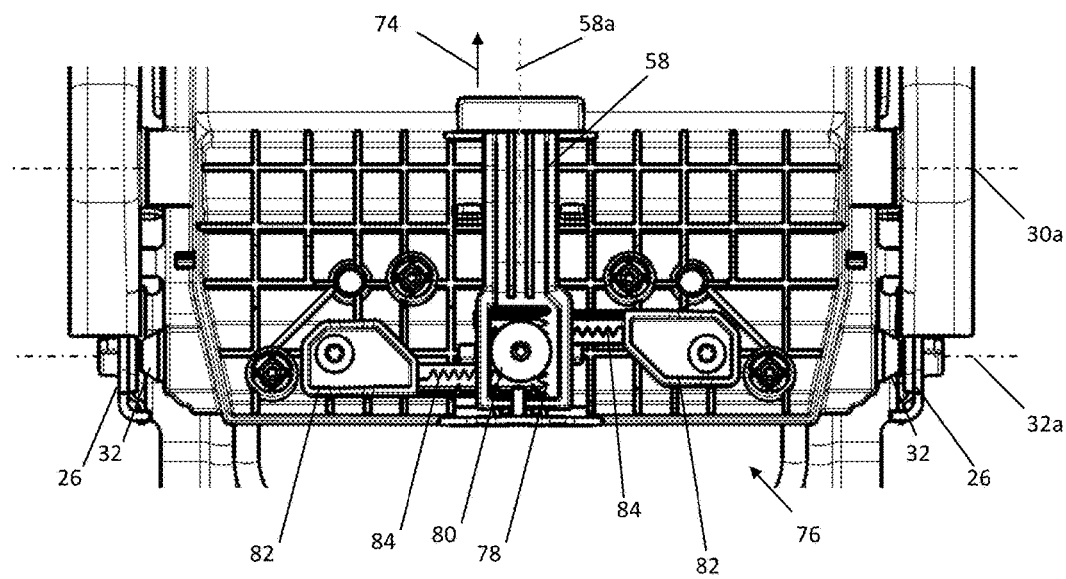
FIG. 7 is an enlarged view of the armrest base and release mechanism, showing the armrest in a locked position.

Referring now to FIG. 7, an enlarged view of the armrest base 38 and the armrest release mechanism 36 is shown. FIG. 7 is shown with the cover panel 88 removed so that the underlying components of the actuator 76 are visible. Although not visible in FIG. 7, the latch extensions 60 are located within the latch slot 42 in the armrest base 38, with the latch spring 62 located therebetween. As previously described, the latch spring 62 applies a force to each of the latch extensions 60 to push them apart from one another along the latch axis 32a, which pushes the latch pins 32 into the respective latch openings 34 in the respective latch plates 26. As a result, each of the latch pins 32 will engage the respective support plate 26 to prevent rotation of the armrest 12 relative to the frame 24 about the pivot axis 30a. Thus, the armrest 12 is shown in the storage position in FIG. 7.

Figure 8:
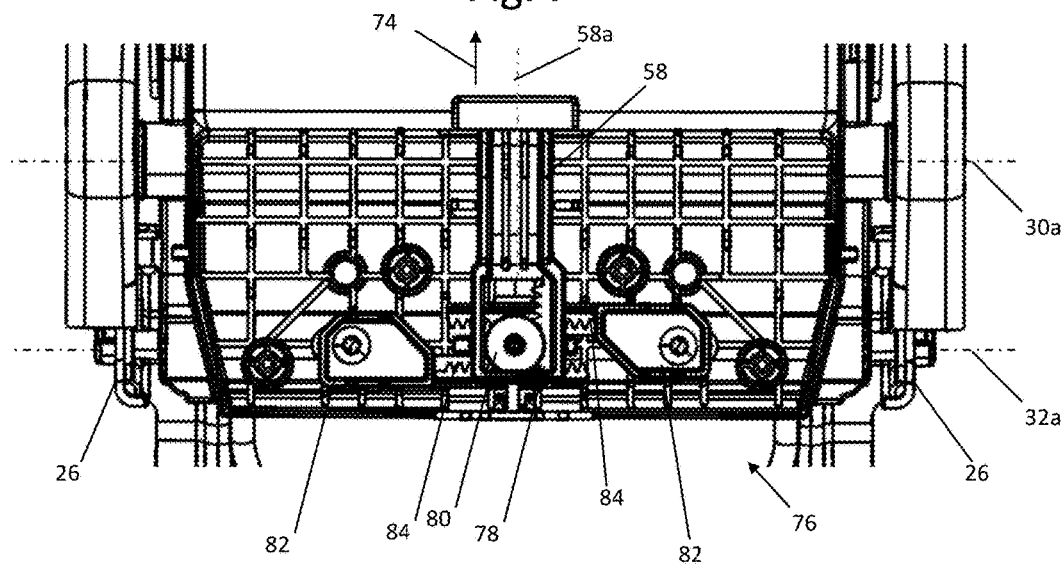
FIG. 8 is a view similar to that illustrated in FIG. 7, with the armrest shown in an unlocked position.

Referring to FIG. 8, a view similar to that illustrated in FIG. 7 is shown, when the release handle 20 has been moved in the handle release direction 72. As previously described in reference to FIG. 6, when the release handle 20 is moved in the release direction 72, the slider 46 is moved in the slider release direction 74. The movement of the slider 46 in the release direction 74 will cause the slider gear rack 78 to also move linearly in the release direction 74 which will cause the pinion 80 to rotate relative to armrest base 38, in the counter-clockwise direction as viewed in FIG. 8. The rotation of the pinion 80 will cause the extension racks 84 and the extension sliders 82 to move relative to the armrest base 38 toward each other in the direction parallel to the latch axis 32a. Because the extension sliders 82 are connected to the latch extensions 60, the latch extensions 60 also move toward each other in the direction parallel to the latch axis 32a. This movement of the latch extensions 60 will compress the latch spring 62. This movement of the latch extensions 60 also removes the latch pins 32 from the latch openings 34. As a result, the armrest 12 is able to rotate relative to the frame 24 about the pivot axis 30a.

As previously described, the latch spring 62 is located between the latch extensions 60 and applies a force to each of the latch extensions 60 to bias them apart from one another along the latch axis 32a. The latch spring 62 is not visible in FIG. 8 because it is located within the latch slot 42 and is hidden by the armrest base 38. The force applied by the latch spring 62 will also bias the extension sliders 82 and the extension racks 84 apart from one another parallel to the latch axis 32a. When the extension sliders 82 are pushed away from each other, they will cause the pinion 80 to rotate relative to the armrest body, in the clockwise direction as viewed in FIG. 8. This rotation of the pinion 80 will cause the slider gear rack 78 and the slider 46 to move in a direction opposite the release direction 74. As should be appreciated in reference to FIG. 6, this movement of the slider 46 will cause the release handle 20 to rotate about the pivot area 70 back to the position shown in FIG. 6. Consequently, when an occupant applies the force to the release handle 20, the armrest 12 is unlatched and may be moved from the storage position to the use position. When the armrest 12 is moved from the use position to the storage position the armrest 12 will be latched in the storage position, and the release handle 20 will be returned to the position illustrated in FIG. 6.

It should be appreciated that the latch pins 32 may be pushed away from each other along the latch axis 32a when the armrest 12 is not in the storage position relative to the seat 10. In that case, the latch pins 32 will not enter the latch openings 34 but will engage faces of the respective support plates 26. The armrest 12 may then continue to be rotated relative to the seat 10 until the armrest 12 is returned to the storage position, when the latch pins 32 will enter the respective latch openings 34 on the support plates 26 to the condition shown in FIG. 7. The armrest 12 is then latched in position relative to the seat 10.

In the preceding description of the preferred embodiment of the armrest release mechanism 36, a particular armrest 12 was used as an example. However, it should be appreciated that the armrest release mechanism 36 may be used with any desired armrest or with any desired device that is connected to a frame for relative rotational movement. The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle armrest comprising:
   an armrest base including a pivot axle that extends along a pivot axis; and
   a release mechanism that includes:
   (1) a pair of latch extensions supported on the armrest base for relative movement along a latch axis that is substantially parallel to the pivot axis;
   (2) a latch spring biasing the latch extensions apart from each other;
   (3) a release handle mounted on the armrest base for relative movement in a handle release direction; and
   (4) a pinion mounted on the armrest base for relative rotational movement and engaged with both of the pair of latch extensions;
   wherein movement of the release handle in the handle release direction causes rotation of the pinion relative to the armrest base, and rotation of the pinion relative to the armrest base causes both of the pair of latch extensions to move along the latch axis toward one another.

2. The vehicle armrest of claim 1, further comprising a slider supported on the armrest base for relative movement along a slide axis that is generally perpendicular to the latch axis, wherein the slider includes a gear rack that engages the pinion such that when the release handle is moved in the handle release direction the slider moves in a release direction parallel to the slide axis.

3. The vehicle armrest of claim 2, wherein the latch spring also biases the slider in a direction opposite the release direction.

4. The vehicle armrest of claim 3, wherein the release handle is also biased in a direction opposite the handle release direction.

5. The vehicle armrest of claim 4, further comprising a frame that the pivot axle is mounted to for relative rotational movement of the armrest base; wherein the latch extensions engage the frame to prevent movement of the armrest base relative to the frame.

6. The vehicle armrest of claim 1, wherein teeth provided on the pinion are engaged with teeth provided on both of the pair of latch extensions such that rotation of the pinion relative to the armrest base causes both of the pair of latch extensions to move along the latch axis toward one another.

7. The vehicle armrest of claim 1, wherein the release handle is mounted on the armrest base for linear movement.

8. The vehicle armrest of claim 1, wherein each of the pair of latch extensions is supported on the armrest base for linear movement.

9. The vehicle armrest of claim 1, wherein the release handle is mounted on the armrest base for linear movement, and wherein each of the pair of latch extensions is supported on the armrest base for linear movement.

* * * * *